(12) United States Patent
He et al.

(10) Patent No.: US 12,702,933 B2
(45) Date of Patent: Aug. 11, 2026

(54) LAUNCHING DEVICE OF ROLLER COASTERS

(71) Applicant: Guangdong Jinma Entertainment Corp., Ltd, Zhongshan (CN)

(72) Inventors: Wenbiao He, Zhongshan (CN); Yueyong Wang, Zhongshan (CN); Pinlun Huang, Zhongshan (CN)

(73) Assignee: Guangdong Jinma Entertainment Corp., Ltd, Zhongshan (CN)

( * ) Notice: Subject to any disclaimer, the term of this patent is extended or adjusted under 35 U.S.C. 154(b) by 431 days.

(21) Appl. No.: 18/496,577

(22) Filed: Oct. 27, 2023

(65) Prior Publication Data

US 2024/0058710 A1 Feb. 22, 2024

Related U.S. Application Data

(63) Continuation of application No. PCT/CN2023/084441, filed on Mar. 28, 2023.

(30) Foreign Application Priority Data

Sep. 7, 2022 (CN) ........................ 202211089835.X

(51) Int. Cl.
*A63G 7/00* (2006.01)
*B61F 1/08* (2006.01)
*B60L 9/00* (2019.01)

(52) U.S. Cl.
CPC .................. *A63G 7/00* (2013.01); *B61F 1/08* (2013.01); *B60L 9/00* (2013.01); *B60L 2200/26* (2013.01)

(58) Field of Classification Search
CPC ..... A63G 7/00; B61F 1/08; B60L 9/00; B60L 2200/26
USPC .......................................................... 105/413
See application file for complete search history.

(56) References Cited

U.S. PATENT DOCUMENTS 8,091,483 B1 * 1/2012 Sumner .................... A63G 3/00 104/73

FOREIGN PATENT DOCUMENTS

| | | | | |
|---|---|---|---|---|
| CN | 108815856 A | * 11/2018 | ............. A63G 21/06 |
| CN | 209490465 U | 10/2019 | |
| CN | 110404271 A | * 11/2019 | ............. A63G 21/06 |
| CN | 112619171 A | 4/2021 | |
| CN | 214232740 U | 9/2021 | |
| CN | 215980542 U | 3/2022 | |
| CN | 216725746 U | 6/2022 | |
| CN | 218529756 U | 2/2023 | |
| JP | 2003144968 A | 5/2003 | |
| JP | 2006334962 A | 12/2006 | |

* cited by examiner

*Primary Examiner* — Troy Chambers

(57) ABSTRACT

A launching device of a roller coaster, which includes a connecting member. The connecting member is provided with an assembly groove, and two sidewalls of the assembly groove are each provided with a fixing plate. The fixing plate is provided with a magnetic plate assembly. A bottom of the connecting member is connected to a pushing plate. The launching device is arranged on a frame of the roller coaster. A connection concave portion is provided at a location where the pushing plate and the connecting member are connected. A side of the connecting member located at a lower part of the assembly groove is provided with a first mounting corner fitting the connection concave portion.

10 Claims, 9 Drawing Sheets

LAUNCHING DEVICE OF ROLLER COASTERS

CROSS-REFERENCE TO RELATED APPLICATIONS

This application is a continuation of International Patent Application No. PCT/CN2023/084441, filed on Mar. 28, 2023, which claims the benefit of priority from Chinese Patent Applications No. 202211089835. X, filed on Sep. 7, 2022. The content of the aforementioned application, including any intervening amendments thereto, is incorporated herein by reference in its entirety.

TECHNICAL FIELD

This application relates to roller coasters, and more particularly to a launching device of roller coasters.

BACKGROUND

The existing catapult launch coasters based on electromagnetic launch require a propelling mechanism to propel the coaster in the launching stage. However, the propelling mechanism is generally separated from in the prior art, and it is necessary to combine the propelling mechanism with the coaster in advance to complete the launching. After the launching stage, the propelling mechanism should be separated from the coaster. The whole process is cumbersome, and the combination of the propelling mechanism and the roller coaster is not conducive to the launch control of the coaster.

SUMMARY

In view of this, an object of the present disclosure is to provide a launching device of roller coasters, which includes a pushing plate to push the coaster for launching.

The technical solutions of the present disclosure are described below.

This application provides a launching device of a roller coaster, wherein the launching device is arranged on a frame of the roller coaster; and

- the launching device comprises a connecting member; the connecting member is provided with an assembly groove; two sidewalls of the assembly groove are each fixedly provided with a fixing plate; the fixing plate is provided with a magnetic plate assembly; and a side of the connecting member is connected to a pushing plate.

In an embodiment, the connecting member has an integrated structure.

In an embodiment, the assembly groove is configured such that the connecting member has an N-shaped structure; the two sidewalls of the assembly groove are vertical planes parallel to each other; and the fixing plate is arranged on each of the two sidewalls of the assembly groove.

In an embodiment, the connecting member comprises a plurality of connecting plates; and an upper portion of each of the plurality of connecting plates is detachably arranged on the frame of the roller coaster.

In an embodiment, each of the plurality of connecting plates is provided with the assembly groove; and each of the plurality of connecting plates is detachably arranged on the fixing plate.

In an embodiment, the pushing plate is connected to a bottom of the connecting member; a connection concave portion is provided at a location where the pushing plate and the connecting member are connected; and a side of the connecting member located as a lower part of the assembly groove is provided with a first mounting corner that fits the connection concave portion.

In an embodiment, the first mounting corner is provided with a first threaded hole, and a bottom surface of the connection concave portion is provided with a second threaded hole corresponding to the first threaded hole; and the connecting member is boltedly connected with the pushing plate through the first threaded hole and the second threaded hole.

In an embodiment, a front side and a rear side of the fixing plate are each provided with a protective plate that is configured to clamp the magnetic plate assembly.

In an embodiment, a portion of a bottom of the frame of the roller coaster located at the front side and the rear side of the fixing plate is connected to an auxiliary support plate; the auxiliary support plate is provided with a mounting groove that is configured to clamp the fixing plate; and a bottom of the auxiliary support plate is provided with a second mounting corner that is configured to be clamped and fixedly connected with the connection concave portion.

In an embodiment, a third threaded hole is provided on the connecting member; the bottom of the frame of the roller coaster is provided with a fourth threaded hole corresponding to the third threaded hole; the connecting member is boltedly connected to the frame of the roller coaster through the fourth threaded hole and the third threaded hole; the auxiliary supporting plate is provided with a fifth threaded hole corresponding to the fourth threaded hole; and the auxiliary support plate is boltedly connected to the frame of the roll coaster through the fourth threaded hole and the fifth threaded hole.

Compared to the prior art, this application has the following beneficial effects.

The launching device provided in this application is provided with a pushing plate. The pushing plate is magnetic, so that the pushing plate can move forward through electromagnetic conversion act, thereby pushing the roller coaster to complete the ejection start. Moreover, the pushing plate is fixed to the frame of the roller coaster, so that the combination of the roller coaster and the delivery mechanism is not required for pushing the roller coaster for the ejection start.

DETAILED DESCRIPTION OF EMBODIMENTS

The technical solutions in the embodiments of the present disclosure will be clearly and completely described below with reference to the accompanying drawings.

Figure 1:
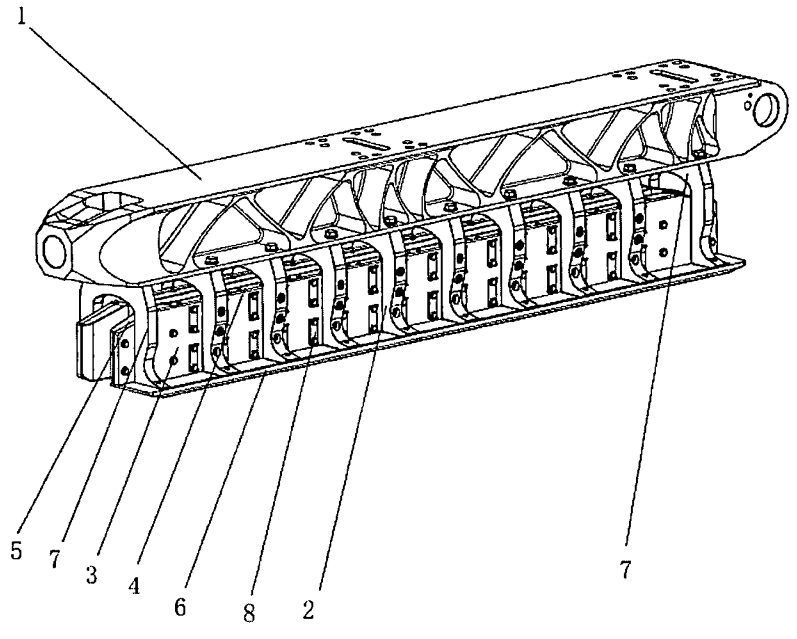
FIG. 1 is a schematic diagram of a launching device of a roller coaster according to an embodiment of the present disclosure.
Figure 2:
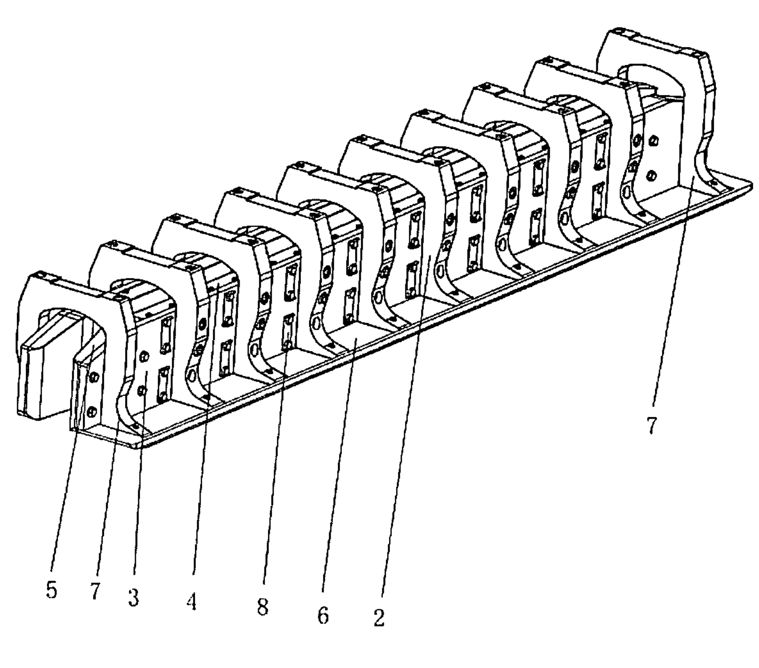
FIG. 2 schematically shows assembly of a connecting member, a fixing plate, a magnetic plate assembly and a pushing plate in the launching device according to an embodiment of the present disclosure.
Figure 3:
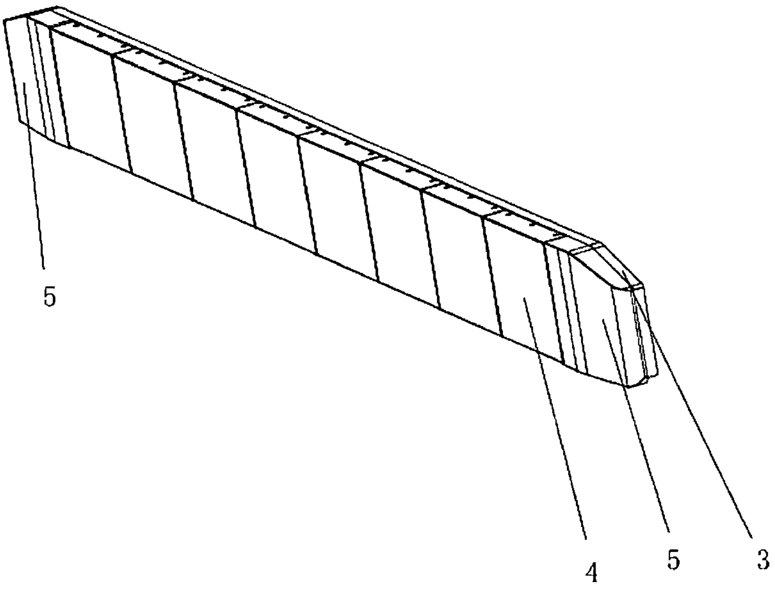
FIG. 3 schematically shows assembly of the connecting member, the fixing plate and a guiding plate in the launching device according to an embodiment of the present disclosure.
Figure 4:
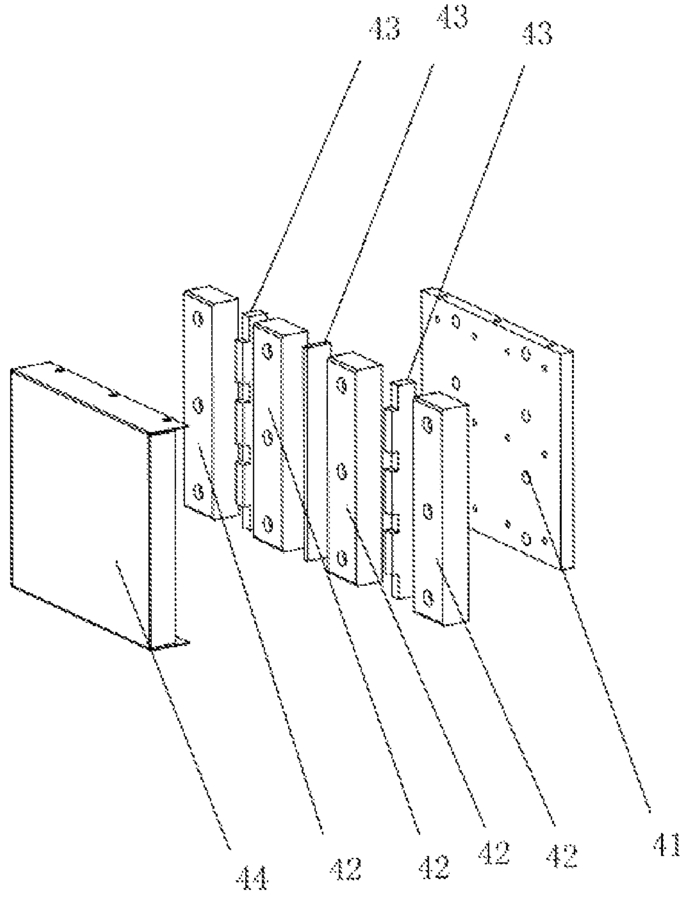
FIG. 4 is an exploded view of the magnetic plate assembly of the launching device according to an embodiment of the present disclosure.
Figure 5:
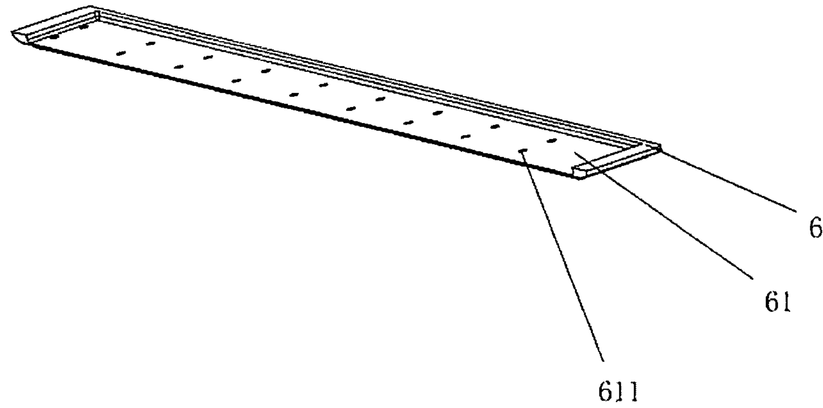
FIG. 5 is a schematic diagram of the pushing plate of the launching device according to an embodiment of the present disclosure.
Figure 6:
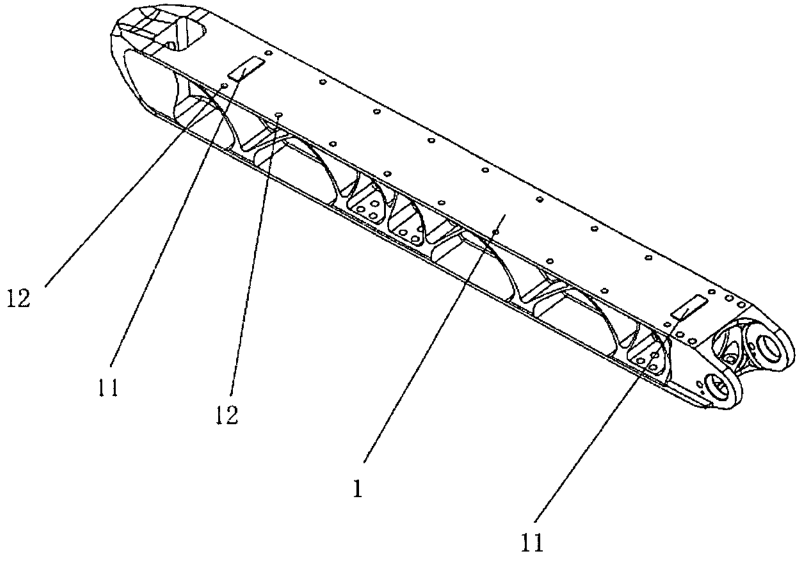
FIG. 6 is a schematic diagram of a frame of the roller coaster according to an embodiment of the present disclosure.
Figure 7:
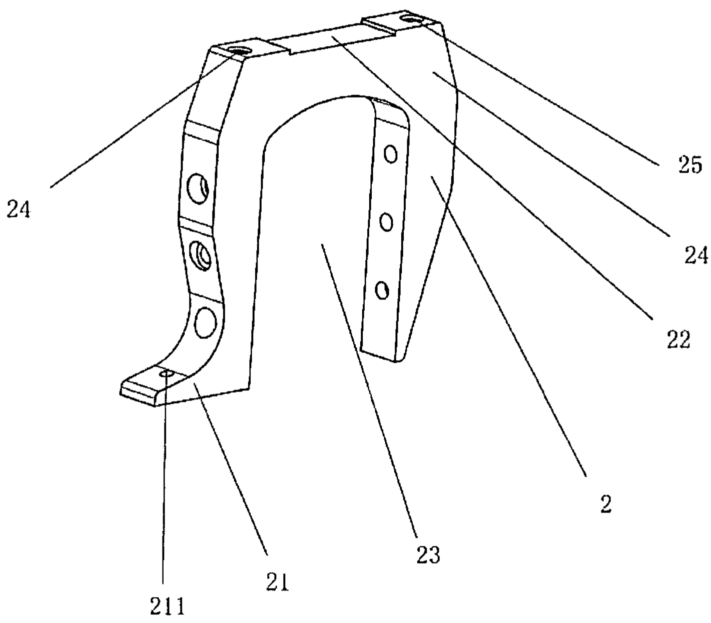
FIG. 7 is a schematic diagram of the connecting member of the launching device according to an embodiment of the present disclosure.
Figure 8:
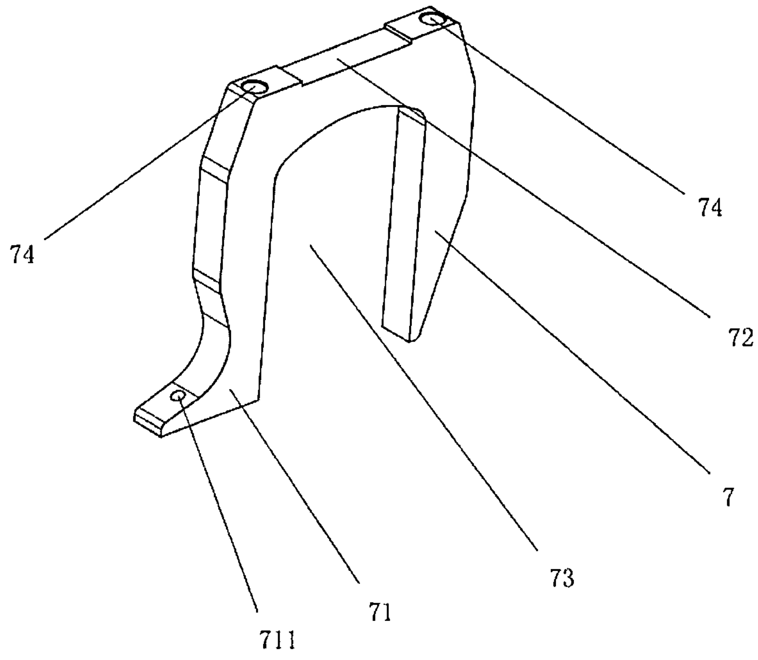
FIG. 8 is a schematic diagram of an auxiliary support plate of the launching device according to an embodiment of the present disclosure.
Figure 9:
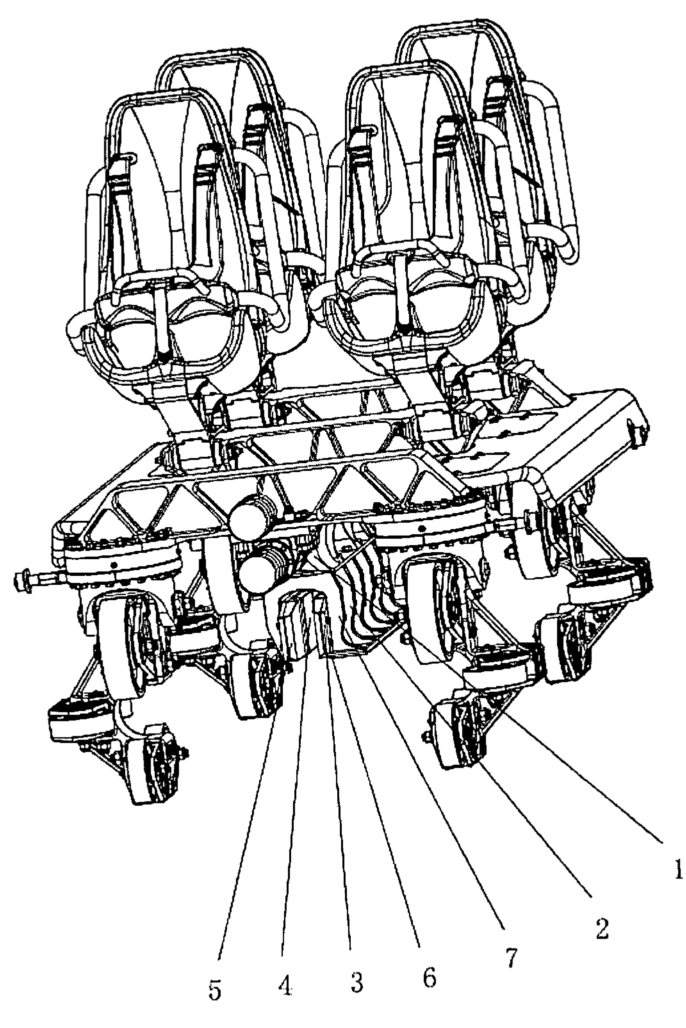
FIG. 9 schematically shows mounting of the launching device on the roller coaster according to an embodiment of the present disclosure.

Referring to FIGS. 1-9, an launching device of a roller coaster is provided, which includes a plurality of connecting members 2. Each of the plurality of connecting members 2 is provided with an assembly groove 23. Two sidewalls of the assembly groove 23 are each fixedly provided with a fixing plate 3, and the plurality of connecting members 2 are assembled and fixed on the fixing plate 3. The fixing plate 3 is also provided with a plurality of magnetic plate assembly 4. A side of the connecting member 2 is connected to a pushing plate 6. The pushing plate 6 is magnetic such that when the roller coaster needs to be launched, the electromagnetic conversion acts on the pushing plate 6 to move the pushing plate forward, so as to push the roller coaster to complete the launching.

In the present disclosure, an assembly groove 23 is provided on the connecting member 2 such that the connecting member 2 has an N-shaped structure. The two sidewalls of the assembly groove 23 are vertical planes parallel to each other. The fixing plate 3 is arranged on the sidewalls of the assembly groove 23, and is placed on an upper surface of the pushing plate 6. The shape of the fixing plate 3 fits with the shape of the upper surface of the pushing plate 6 to enable the firm connection between the fixing plate 3 and the pushing plate 6 through the connecting member 2.

In an embodiment, the connecting member 2 has an integrated structure, which can be molded by one-piece casting, or can be prepared by opening an assembly groove 23 on a piece of plate, so as to firmly connect the pushing plate 6, the fixing plate 3, and a frame 1 of the roller coaster together through the connecting member 2.

In an embodiment, the connecting member 2 includes a plurality of connecting plates 24, so as to save costs. An upper portion of each of the plurality of connecting plates 24 is detachably arranged on the frame 1 of the roller coaster.

Further, each of the plurality of connecting plates 24 is provided with the assembly groove 23, and is detachably assembled on a fixing plate 3. The plurality of connecting plates 24 are strung through the fixing plates 3 and are fixed to the fixing plate 3, facilitating the subsequent assembly of the plurality of connecting plates 24 on the frame of the roller coaster 1.

In the present application, a connection concave portion 61 is provided at the connection between the pushing plate 6 and the connecting member 2, and a side of the connecting member 2 located at a lower part of the assembly groove is provided with a first mounting corner 21 that fits the connection concave portion 61, so as to facilitate the mounting and positioning of the connecting member 2 on the pushing plate 6.

In the present application, the first mounting corner 21 is provided with a first threaded hole 211, and a bottom surface of the connection concave portion 61 is provided with a second threaded holes 611 corresponding to the first threaded hole 211, so that the connecting member 2 is boltedly connected with the pushing plate 6 through the first threaded hole 211 and the second threaded hole 611.

In the present application, a front side and a rear side of the fixing plate 3 are each provided with a protective plate 5 that clamps the magnetic plate assembly 4, so that the magnetic plate assembly 4 is protected by the protective plate 5 to prevent it from being damaged by collision.

In the present disclosure, a portion of a bottom of the frame 1 of the roller coaster located at the front side and the rear side of the fixing plate 3 is connected to an auxiliary support plate 7. The auxiliary support plate 7 is provided with a mounting groove 73 that is configured to clamp the two sides of the fixing plate 3, and is provided with a second mounting angle 71 that is configured to be clamped and fixedly connected with the connection concave portion 61. The auxiliary support plate 7 is mounted on the pushing plate 6 to position the pushing plate 6, which facilitate the fixing of the connecting member 2 to the pushing plate 6 afterwards.

In the present disclosure, a third threaded hole 25 is provided on the connecting member 2, and a fourth threaded hole 12 corresponding to the third threaded hole 25 is provided at the bottom of the frame 1 of the roller coaster. The connecting member 2 is boltedly connected to the frame 1 of the roller coaster through the fourth threaded hole 12 and the third threaded hole 25. The auxiliary supporting plate 7 is provided with a fifth threaded hole 74 corresponding to the fourth threaded hole 12, and the fourth threaded hole 12 is boltedly connected to the fifth threaded hole 74 to enable the removable fixed connection between the auxiliary support plate 7 and the frame 1 of the roll coaster. At the same time, the bottom of the frame 1 of the roll coaster is provided with a limiting projection 11. The connecting member 2 is provided with a first limiting groove 22 corresponding to the limiting projection 11. The auxiliary support plate 7 is provided with a second limiting groove 72 corresponding to the limiting projection 11, so as to facilitate the assembly and fixing of the connecting member 2 and the auxiliary support plate 7 onto the frame 1 of the roll coaster.

In the present disclosure, the magnetic plate assembly 4 includes a mounting plate 41, a plurality of magnetic poles 42 provided on the mounting plate 41, a separator 43 provided on the mounting plate 41 and configured to separate the plurality of magnetic poles 42, and a cover plate 44 wrapping the plurality of magnetic poles 42 and the separator 43 and covered on the mounting plate 41.

What is claimed is:

1. A launching device of a roller coaster, wherein the launching device is arranged on a frame of the roller coaster; and the launching device comprises a connecting member; the connecting member is provided with an assembly groove; two sidewalls of the assembly groove are each fixedly provided with a fixing plate; the fixing plate is provided with a magnetic plate assembly; and a side of the connecting member is connected to a pushing plate.

2. The launching device of claim 1, wherein the connecting member has an integrated structure.

3. The launching device of claim 1, wherein the assembly groove is configured such that the connecting member has an N-shaped structure; the two sidewalls of the assembly groove are vertical planes parallel to each other.

4. The launching device of claim 1, wherein the connecting member comprises a plurality of connecting plates; and an upper portion of each of the plurality of connecting plates is detachably arranged on the frame of the roller coaster.

5. The launching device of claim 4, wherein each of the plurality of connecting plates is provided with the assembly groove; and each of the plurality of connecting plates is detachably arranged on the fixing plate.

6. The launching device of claim 1, wherein the pushing plate is connected to a bottom of the connecting member; a connection concave portion is provided at a location where the pushing plate and the connecting member are connected; and a side of the connecting member located at a lower part of the assembly groove is provided with a first mounting corner that fits the connection concave portion.

7. The launching device of claim 6, wherein the first mounting corner is provided with a first threaded hole, and a bottom surface of the connection concave portion is provided with a second threaded hole corresponding to the first threaded hole; and the connecting member is boltedly connected with the pushing plate through the first threaded hole and the second threaded hole.

8. The launching device of claim 7, wherein a front side and a rear side of the fixing plate are each provided with a protective plate that is configured to clamp the magnetic plate assembly.

9. The launching device of claim 8, wherein a portion of a bottom of the frame of the roller coaster located at the front side and the rear side of the fixing plate is connected to an auxiliary support plate; the auxiliary support plate is provided with a mounting groove that is configured to clamp the fixing plate; and a bottom of the auxiliary support plate is provided with a second mounting corner that is configured to be clamped and fixedly connected with the connection concave portion.

10. The launching device of claim 9, wherein a third threaded hole is provided on the connecting member; the bottom of the frame of the roller coaster is provided with a fourth threaded hole corresponding to the third threaded hole; the connecting member is boltedly connected to the frame of the roller coaster through the fourth threaded hole and the third threaded hole; the auxiliary supporting plate is provided with a fifth threaded hole corresponding to the fourth threaded hole; and the auxiliary support plate is boltedly connected to the frame of the roll coaster through the fourth threaded hole and the fifth threaded hole.

* * * * *